(12) United States Patent
Jasmin et al.

(10) Patent No.: US 11,750,143 B1
(45) Date of Patent: Sep. 5, 2023

(54) BRACKET AND DEVICES FOR MOUNTING SOLAR PANELS TO ROOFS

(71) Applicant: Sunmodo Corporation, Vancouver, WA (US)

(72) Inventors: Roland Jasmin, Portland, OR (US); Jun Liu, Camas, WA (US); Steve Mumma, Oregon City, OR (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 18/101,111

(22) Filed: Jan. 24, 2023

(51) Int. Cl.
*H02S 20/23* (2014.01)
*H02S 30/10* (2014.01)

(52) U.S. Cl.
CPC ............. *H02S 20/23* (2014.12); *H02S 30/10* (2014.12)

(58) Field of Classification Search
None
See application file for complete search history.

(56) References Cited

U.S. PATENT DOCUMENTS

| | | |
|---|---|---|
| D16,571 S | 3/1886 | Kenna |
| 712,824 A | 11/1902 | Masland |
| D173,720 S | 12/1954 | Carver et al. |
| 4,344,593 A | 8/1982 | Canto |
| D278,111 S | 3/1985 | Mazeika |
| 4,835,935 A | 6/1989 | Murphy |
| D312,382 S | 11/1990 | Ryll |
| D357,400 S | 4/1995 | Sachs |
| 5,720,571 A | 2/1998 | Frobosilo et al. |
| 6,213,679 B1 | 4/2001 | Frobosilo et al. |
| D546,366 S | 7/2007 | Dittmer |
| D584,597 S | 1/2009 | Menard |
| D666,473 S | 9/2012 | Despotellis |
| D666,474 S | 9/2012 | Despotellis |
| D666,895 S | 9/2012 | Despotellis |

(Continued)

FOREIGN PATENT DOCUMENTS

| | | |
|---|---|---|
| AU | 2009100911 A4 | 10/2009 |
| CN | 206559283 U | 10/2017 |

(Continued)

OTHER PUBLICATIONS

Test Our Metal, Sunmodo Metal Roof Mount Product Family, Sep. 2019, Sunmodo Corporation, Vancouver, Washington.

(Continued)

*Primary Examiner* — Steven M Marsh
(74) *Attorney, Agent, or Firm* — Stone Creek Services LLC; Alan M Flum

(57) ABSTRACT

A bracket for attaching solar panels to a roof, in the form of an L-foot, as well as devices and assemblies that utilize the L-foot. The L-foot includes a base and a riser extending upward from the base. The base includes a pair of raised stiffeners each extending obliquely upward toward each other from opposites sides of the base and each extending lengthwise along the base. The base can receive threaded roof fasteners that extend perpendicularly through the raised stiffeners and obliquely through the base. Threaded roof fasteners positioned on opposite raised stiffeners can extend through the roof deck toward each other. The L-foot is compatible with rail-based and rail-less solar panel racking systems.

19 Claims, 19 Drawing Sheets

(56) References Cited

U.S. PATENT DOCUMENTS

| | | | |
|---|---|---|---|
| 8,424,821 B2 * | 4/2013 | Liu | F24S 25/615 248/237 |
| 8,938,932 B1 | 1/2015 | Wentworth et al. | |
| D725,999 S | 4/2015 | Wu | |
| D727,395 S | 4/2015 | Choi et al. | |
| 9,850,638 B2 | 12/2017 | Despotellis | |
| D818,517 S | 5/2018 | Szarawarski | |
| D833,851 S | 11/2018 | Kanter | |
| 10,277,162 B1 * | 4/2019 | Atia | F24S 25/613 |
| 10,288,319 B2 * | 5/2019 | Li | F24S 25/636 |
| 10,447,197 B2 * | 10/2019 | Truthseeker | H02S 20/23 |
| 10,633,858 B2 | 4/2020 | Stahl et al. | |
| D884,302 S | 5/2020 | Azzaro | |
| 10,840,850 B1 * | 11/2020 | Atia | F24S 25/15 |
| D909,853 S | 2/2021 | Jasmin | |
| 10,998,847 B2 | 5/2021 | Stephan et al. | |
| 11,296,648 B1 | 4/2022 | Jasmin et al. | |
| D962,039 S | 8/2022 | Fehr et al. | |
| 11,463,040 B2 | 10/2022 | Affentranger, Jr. | |
| 11,486,134 B2 | 11/2022 | Meine | |
| 11,549,724 B2 * | 1/2023 | Zhu | F24S 25/613 |
| 2012/0049022 A1 | 3/2012 | Coyle | |
| 2012/0187267 A1 * | 7/2012 | Hudson | F24S 25/613 248/292.14 |
| 2015/0270802 A1 * | 9/2015 | Schaefer | F24S 25/61 248/237 |
| 2016/0308486 A1 * | 10/2016 | Atia | F24S 25/33 |
| 2020/0309184 A1 | 10/2020 | Schuit et al. | |
| 2022/0195735 A1 | 6/2022 | Ochi | |
| 2022/0372762 A1 | 11/2022 | Gallegos | |
| 2022/0403862 A1 * | 12/2022 | Justice | H02S 20/23 |

FOREIGN PATENT DOCUMENTS

| | | |
|---|---|---|
| DE | 29718172 U1 | 11/1997 |
| FR | 2876168 A1 | 4/2006 |
| FR | 2970284 A1 | 1/2013 |
| GB | 2457714 A | 8/2009 |
| JP | H0790296 B2 | 10/1995 |
| KR | 20130039030 A | 4/2013 |
| WO | 2021102062 A1 | 5/2021 |
| WO | 2022169989 A1 | 11/2022 |

OTHER PUBLICATIONS

Flash Loc Brochure, Doc. No. JUNE_2021_FLASHLOCCOMP_V2, Jun. 2021, Unirac, Albuquerque, NM.

GripCap+ Brochure, FV-GCP-01-YX-MAN Rev 1.21, Oct. 2022, Ironridge (Esdec Solar Group Company), Hayward, California.

Comp Mount, Jun. 2021, Pegasus Solar Inc., Richmond, California.

Solar's Fastest Attachment NanoMount Rafter or Deck, NanoMount One Sheet, Feb. 2021 Revision, Sunmodo Corporation, Vancouver, Washington.

Jasmin et al, U.S. Appl. No. 29/869,478, filed Dec. 30, 2022, Assignee: Sunmodo Corporation.

Jasmin et al, U.S. Appl. No. 29/869,479, filed Dec. 30, 2022, Assignee: Sunmodo Corporation.

Jasmin et al, Roof Mount Bracket for Mounting Solar Panels, U.S. Appl. No. 29/869,481, filed Dec. 30, 2022, Assignee: Sunmodo Corporation.

Jasmin et al, Roof Mount Bracket for Mounting Solar Panels, U.S. Appl. No. 29/869,482, filed Dec. 30, 2022, Assignee: Sunmodo Corporation.

Jasmin et al, Roof Mount Bracket for Mounting Solar Panels, U.S. Appl. No. 29/869,483, filed Dec. 30, 2022, Assignee: Sunmodo Corporation.

Jasmin et al, Roof Mount Bracket for Mounting Solar Panels, U.S. Appl. No. 29/869,484, filed Dec. 30, 2022, Assignee: Sunmodo Corporation.

EZ Grip Metal Mount Kit (K5032-001 & K5032-002), Document No. D10149-V002, Jun. 2019, Sunmodo Corporation, Vancouver, Washington.

* cited by examiner

BRACKET AND DEVICES FOR MOUNTING SOLAR PANELS TO ROOFS

BACKGROUND

This disclosure relates to L-foot brackets and solar panel racking systems that use L-foot brackets to mount solar panels to roofs.

Solar panels are installed on residential and commercial roofs such as building roof tops or shade structures. In this disclosure, "solar panels" refer to solar photovoltaic panels.

Residential and commercial solar panel assemblies come in a variety of sizes and configurations. For example, a typical residential array of solar panels could include twenty-five solar panels. A commercial solar panel array could use twenty-five hundred solar panels. Installers often secure these solar panel arrays to roofs using solar panel racking systems. Rail-based solar panel racking systems use rails to support the solar panels. Rail-less solar panel racking systems do not use rails. Rail-based and rail-less solar panel racking systems often use some type of roof mounting bracket to support and secure solar panels and their racking systems to the roof. Typically, solar panel arrays use four roof mounting brackets per solar panel. With four roof mounting brackets per solar panel, the residential system array in the example above would use one hundred roof mounting brackets. The commercial array would use ten thousand roof mounting brackets.

SUMMARY

The inventors observed that in some configurations, the solar panel or other portions of the solar panel racking system could interfere with power tools while securing such mounting brackets. Given the number of roof mounting brackets per solar panel array, the inventors set out to develop an improved roof mounting bracket that solved this problem. Utilizing the inventor's L-foot bracket, or "L-foot," the installer could install one or more threaded roof fasteners into the L-foot at an angle, overcoming potential power tool clearance issues. As an additional benefit, the inventors anticipate that angling the threaded roof fasteners inward through the roof deck provides superior holding strength. An installer could use the L-foot in rail-based and rail-less solar panel racking systems.

The L-foot includes a base and a riser extending upward from the base. The base includes a pair of raised stiffeners, each extending obliquely upward toward each other from opposite sides of the base and each extending lengthwise along the base. The raised stiffeners can have a widthwise wedge-shaped cross section. Threaded roof fasteners extend through apertures in the pair of raised stiffeners. The threaded roof fasteners can extend perpendicularly through the corresponding raised stiffener and obliquely through the bottom of the base. Threaded roof fasteners extending obliquely through opposite raised stiffeners extend obliquely through the roof deck toward each other.

The base can optionally include a third raised stiffener positioned between the first raised stiffener and the second raised stiffener and extending lengthwise along the base. The third raised stiffener can include an end that extends obliquely upward from the front side of the base toward the riser. The end of the third raised stiffener can have a lengthwise wedge-shaped cross section. A threaded roof fastener can extend through an aperture in the end of the third raised stiffener and obliquely downward toward the back end of the base and into the roof deck.

The L-foot could optionally seat a gasket in a blind hole, or "recess," positioned in the bottom of the L-foot. Typically, the gasket is waterproof. Examples of suitable waterproof materials include rubber, neoprene, ethylene propylene diene monomer rubber (EDPM), or foamed EPDM. The roof attachment fasteners would extend through the gasket.

The L-foot can include a slot-shaped aperture that extends lengthwise along the riser. The slot-shaped aperture typically receives a threaded fastener that secures the L-foot to other components of the racking system. The slot-shaped aperture can have both ends closed or have one end open at the top of the riser. A slot-shaped aperture closed on both ends can hold the head of the threaded fastener captive. A slot-shaped aperture open on one end, allows a threaded fastener pre-attached to other portions of the racking system to slide along the slot-shaped aperture.

Here are some of the benefits and envisioned benefits provided by the L-foot. (1) An installer is less likely to run into interference between their power tools and the solar panel racking system because the threaded roof fastener is facing obliquely outward. (2) The L-foot assembly may have greater pull-up resistance because a threaded roof fastener secured through the first raised stiffener and another threaded roof fastener secured to the roof through a second raised stiffener pass through the roof deck obliquely toward each other. (3) The raised stiffeners provide additional structural rigidity and strength to the base of the L-foot. (4) The additional thickness of the raised stiffeners provides more material for the mounting structure for the threaded roof fasteners to push against, thus providing greater tightening force than a base without the raised stiffeners.

DETAILED DESCRIPTION

When describing the figures, this Detailed Description may provide specific dimensions. These help the reader understand the scale of the discussed material. Any dimensions given are typical. The claims as well as the described devices and systems, such as the L-foot and solar panel systems, are not limited to the recited dimensions. The Detailed Description and Claims use ordinals such as "first," "second," or "third," to differentiate between similarly-named parts. These ordinals do not imply order, preference, or importance. This disclosure uses "optional" or "optionally" to describe features or structures that are optional. Not using the word "optional" or "optionally" to describe a feature or structure, does not imply that the feature or structure is not optional. This disclosure uses the word "or" in the ordinary sense to mean an "inclusive or," unless preceded by a qualifier, such as the word "either," that signals an "exclusive or."

The Detailed Description is organized into the following sections: "System Overview," "General Principles and Examples," and "Conclusion and Variations."

System Overview

As discussed in the Summary, the inventors observed that in some configurations, the solar panel or other portions of the solar panel racking system could interfere with power tools while securing roof mounting brackets. Given that a typical residential solar array could use over one hundred roof mounting brackets, or a commercial solar array could use as many as ten thousand roof mounting brackets, the inventors set out to develop an improved roof mounting bracket that solved this problem. Utilizing the inventors' L-foot bracket, or "L-foot," the installer could install one or more threaded roof fasteners into the L-foot at an angle, overcoming potential power tool clearance issues. Other features and advantages will become apparent in this Detailed Description and the associated figures.

Figure 1:
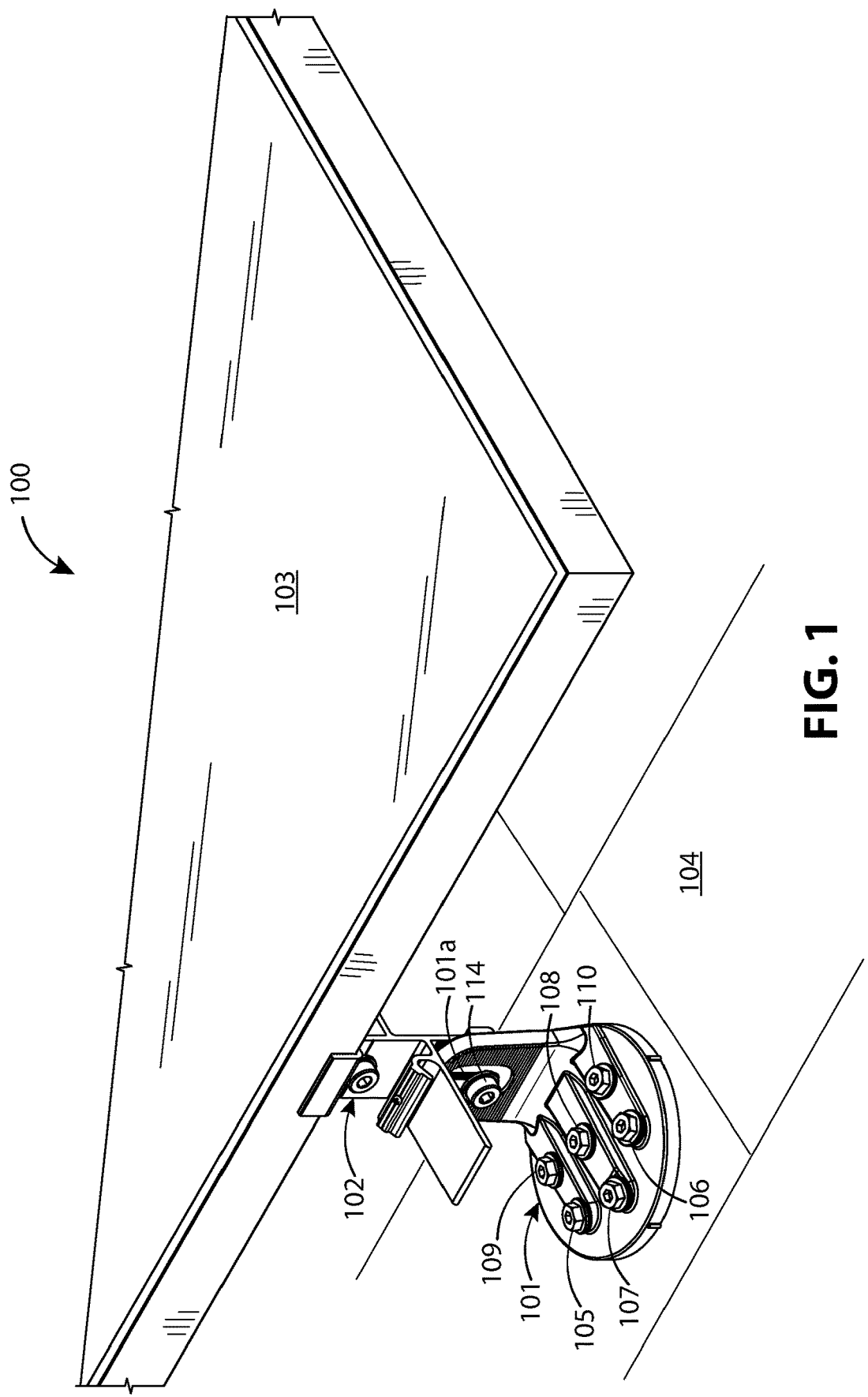
FIG. 1 illustrates a rail-less solar panel system utilizing an L-foot.
Figure 2:
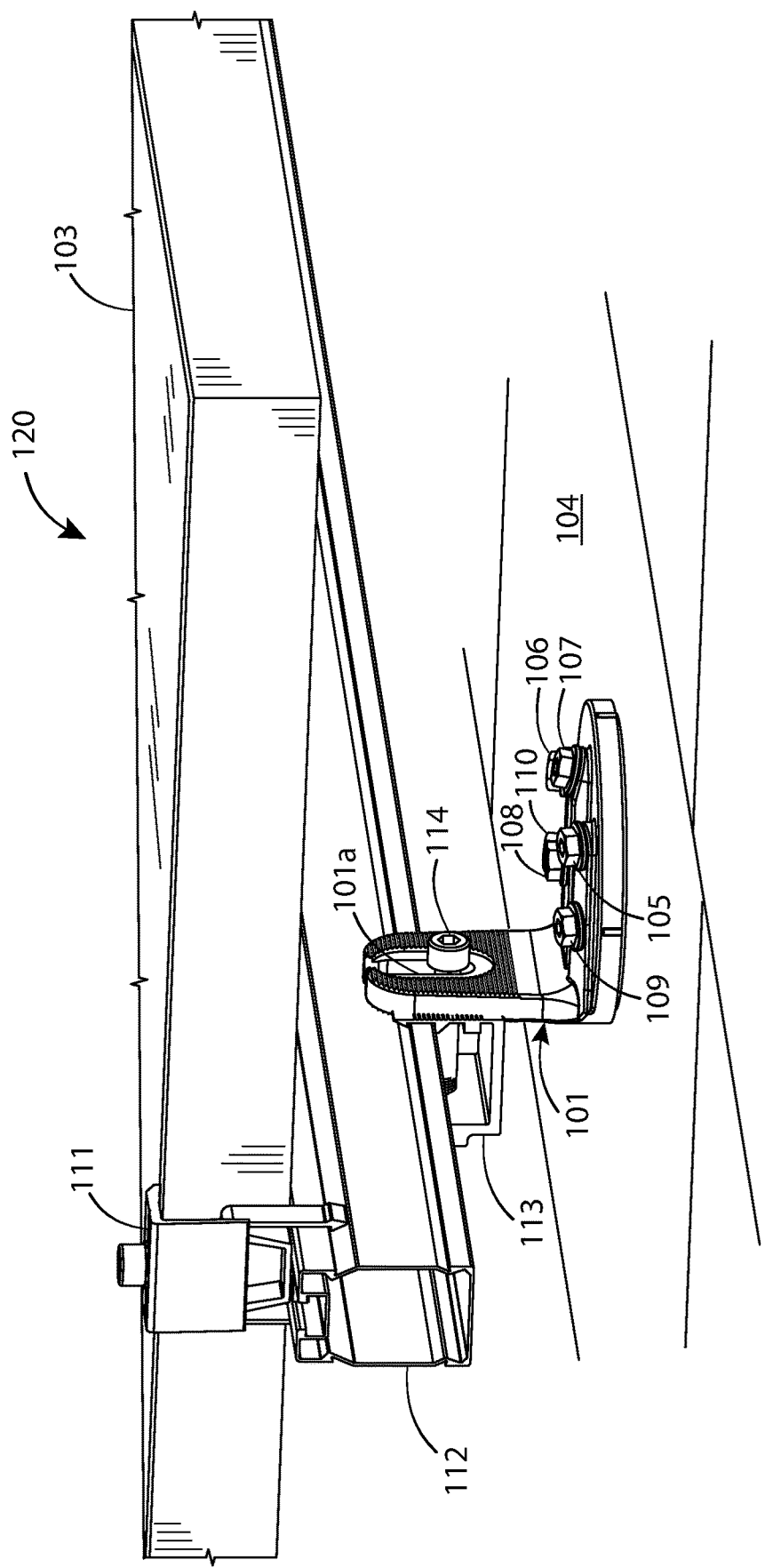
FIG. 2 illustrates a rail-based solar panel system utilizing the L-foot of FIG. 1.

FIG. 1 illustrates the L-foot 101 in the context of a solar panel racking system 100 that is rail-less. FIG. 2 illustrates the L-foot of FIG. 1 used in a solar panel racking system 120 that is rail-based. Referring to FIG. 1, a rail-less mid clamp assembly 102 secures solar panel 103 to the L-foot 101. One or more threaded roof fasteners secure the L-foot 101 to the roof 104. Performance requirements, such as holding strength or lift force resistance, can help the installer determine the appropriate number of roof fasteners to secure the L-foot 101 to the roof. As an example, FIGS. 1 and 2 show a first threaded roof fastener 105, second threaded roof fastener 106, third threaded roof fastener 107, fourth threaded roof fastener 108, fifth threaded roof fastener 109, and sixth threaded roof fastener 110, securing the L-foot 101 to roof 104.

Referring to FIG. 2, end clamp 111 secures solar panel 103 to rail 112. The L-foot adapter 113, in combination with threaded fastener 114, secures rail 112 to the L-foot 101. Loosening the threaded fastener 114, allows the threaded fastener 114 to move up and down along the slot-shaped aperture 101*a* of the L-foot 101. This causes the solar panel 103, end clamp 111, rail 112, and L-foot adapter, to move up or down with respect to the roof 104. Referring to FIG. 1, similarly, loosening the threaded fastener 114 allows it to move up and down along the slot-shaped aperture 101*a* of the L-foot 101. This causes the solar panel 103 and the rail-less mid clamp assembly 102 to move up or down with respect to the roof 104.

General Principles and Examples

Figure 12:
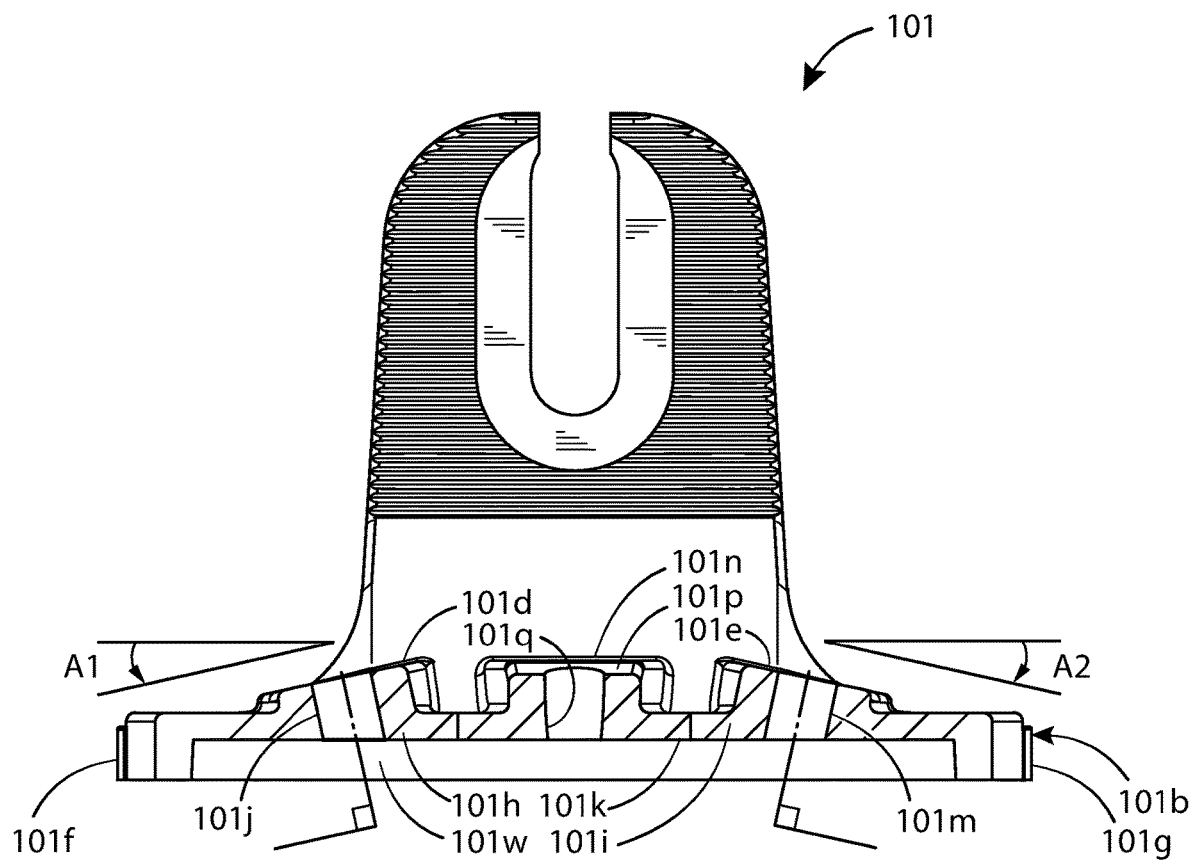
FIG. 12 illustrates a section view of the L-foot of FIG. 1 taken along section lines 12-12 of FIG. 10.
Figure 13:
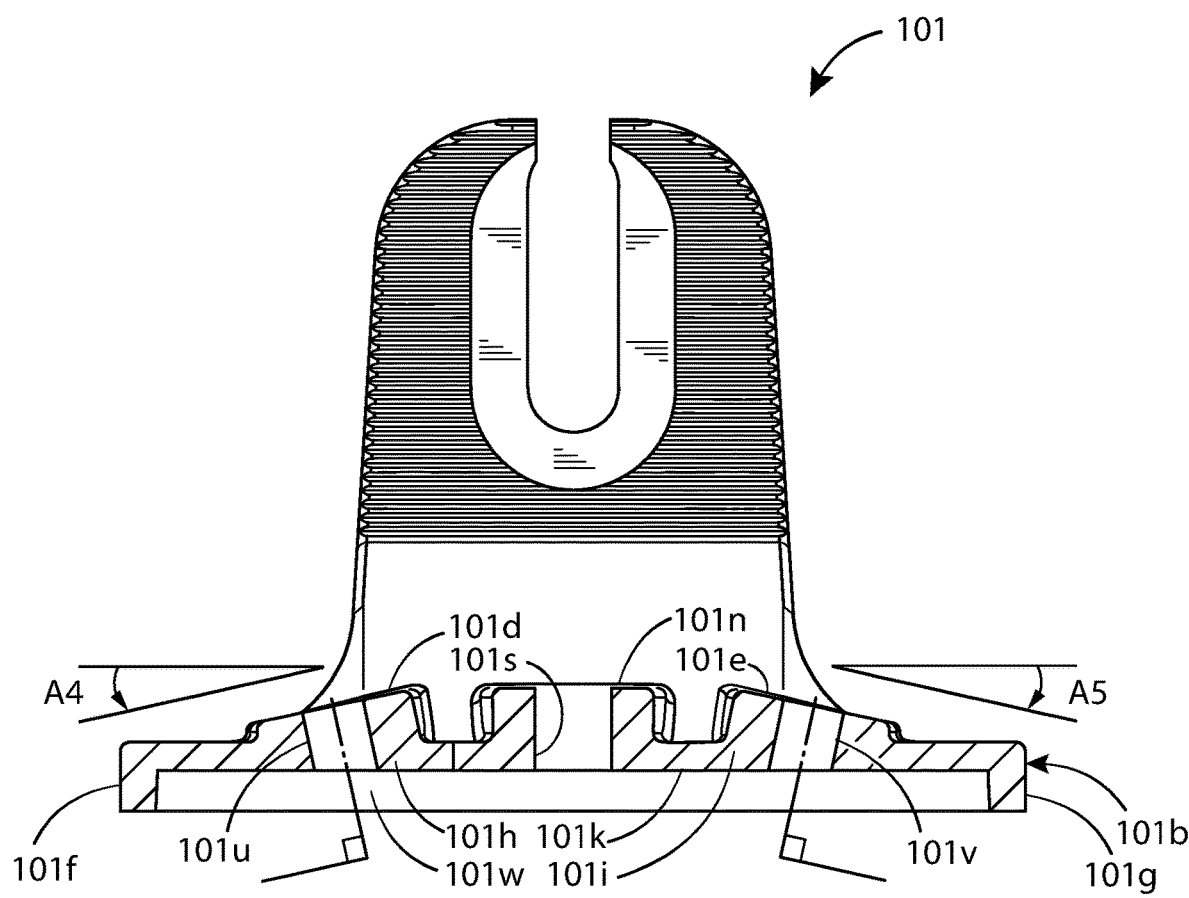
FIG. 13 illustrates a section view of the L-foot of FIG. 1 taken along section lines 13-13 of FIG. 10.
Figure 14:
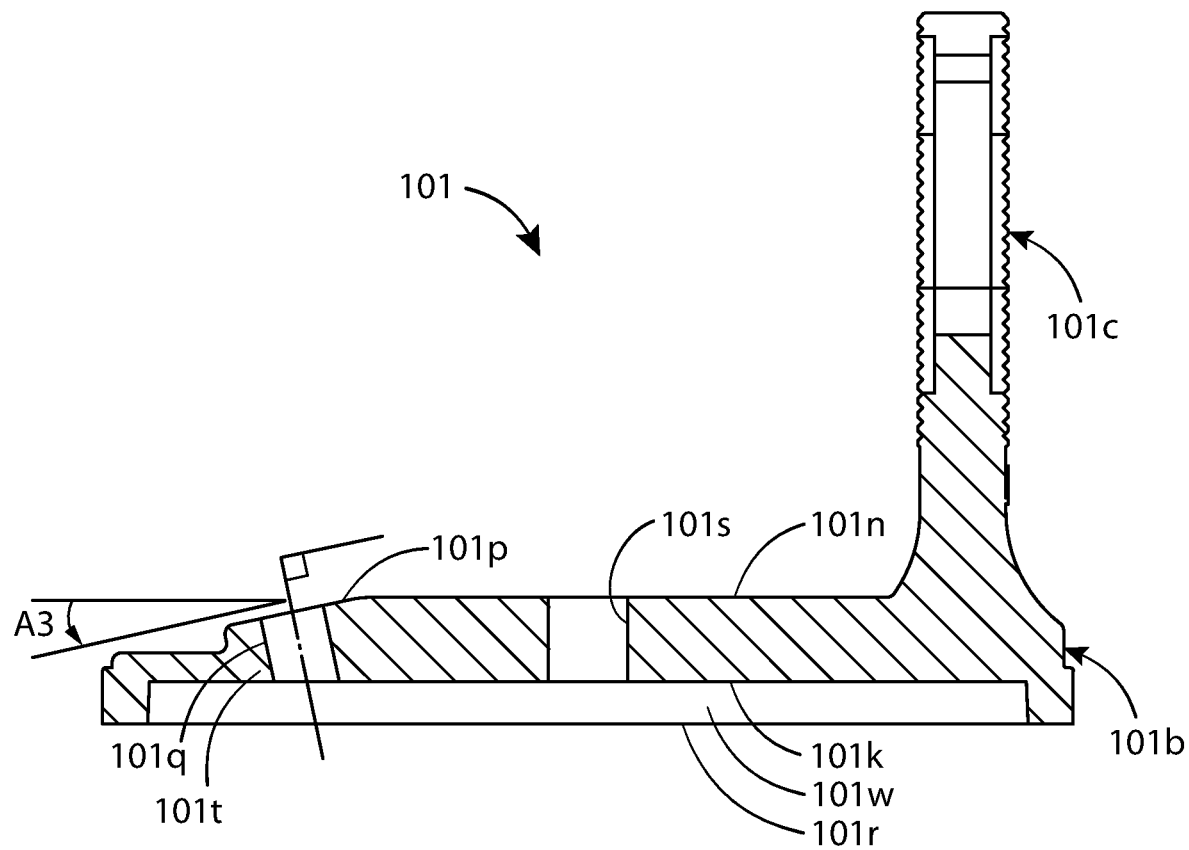
FIG. 14 illustrates a section view of the L-foot of FIG. 1 taken along section lines 14-14 of FIG. 11.

FIGS. 3-11 illustrate a front isometric view, rear isometric view, front view, rear view, right side view, left side view, bottom view, top view, and a second top view, respectively of the L-foot 101. FIGS. 12,13, and 14 are section views along the base 101*b* of the L-foot 101. FIG. 12 illustrates a section view taken along section lines 12-12 in FIG. 10. FIG. 13 illustrates a section view taken along section lines 13-13 of FIG. 10. FIG. 14 illustrates a section view taken along section lines 14-14 in FIG. 11.

Referring to FIGS. 3-5, 7, 8, 10, and 11, the L-foot includes a base 101*b* and a riser 101*c* extending upward from the base 101*b*. Together, the base 101*b* and the riser 101*c* form a substantially L-shape bracket. Referring to FIGS. 3-5, 10 and 11, the base 101*b* includes a first raised stiffener 101*d*, and a second raised stiffener 101*e*, each extending obliquely upward toward each other from opposite sides of the base 101*b*, and each extending lengthwise along the base 101*b*. Lengthwise, for the purposes of this disclosure, means in the direction from front-to-back or back-to-front of the base 101*b*. The first raised stiffener 101*d* extends obliquely upward away from a first side 101*f* and the second raised stiffener 101*e* extends obliquely upward away from a second side 101*g*.

Referring to FIG. 12, the first raised stiffener 101*d* extends obliquely upward at an angle A1 with respect to the horizon. The second raised stiffener extends obliquely upward at an angle A2 with respect to the horizon. In this example, the top and the bottom of the base 101*b* are parallel to the horizon. The inventors built and tested the L-foot 101 with the angle A1 equal to 15° and the angle A2 equal to 15°. The inventors anticipate that angle A1 and angle A2 can each vary from 10° to 45° angle range and still provide sufficient holding strength through the roof deck, and allow the installer greater access to threaded roof fasteners with their installation tools.

Figure 5:
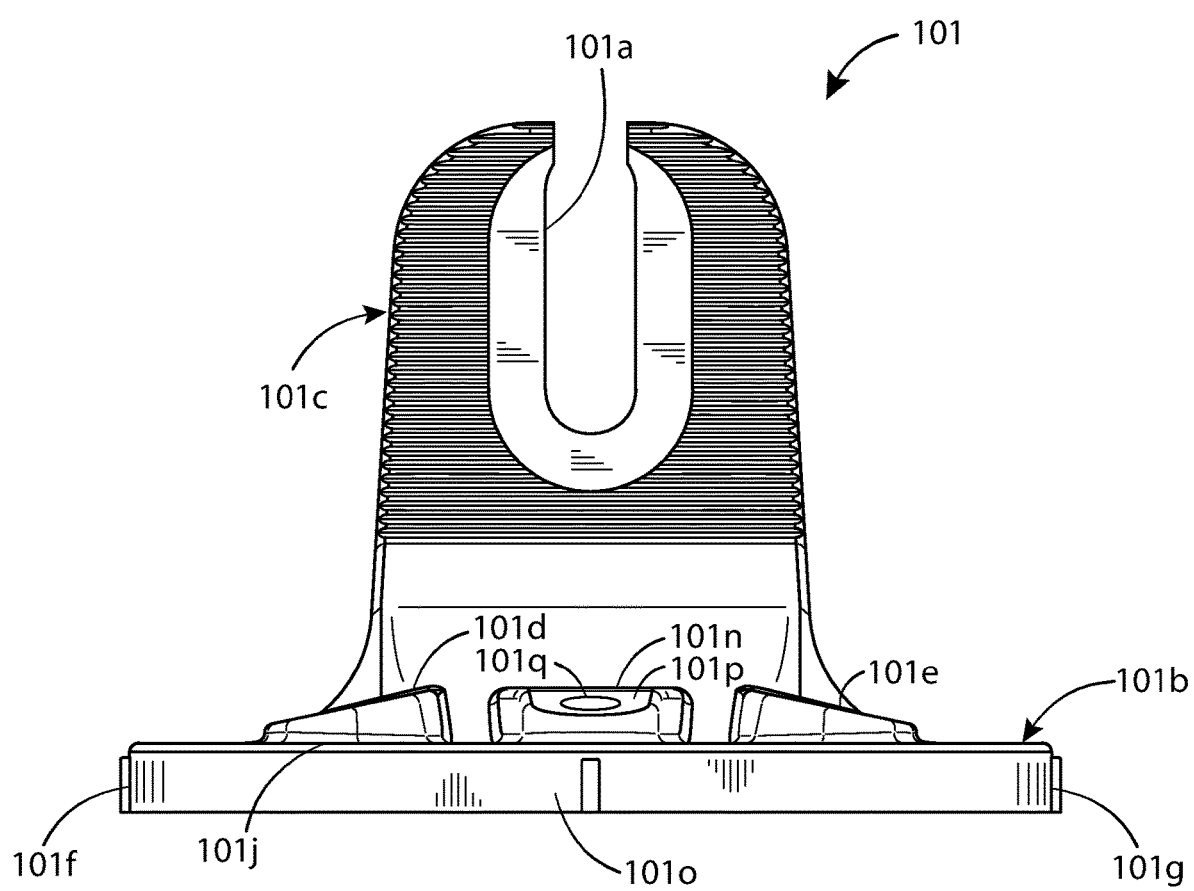
FIG. 5 illustrates in front view, the L-foot of FIG. 1.
Figure 6:
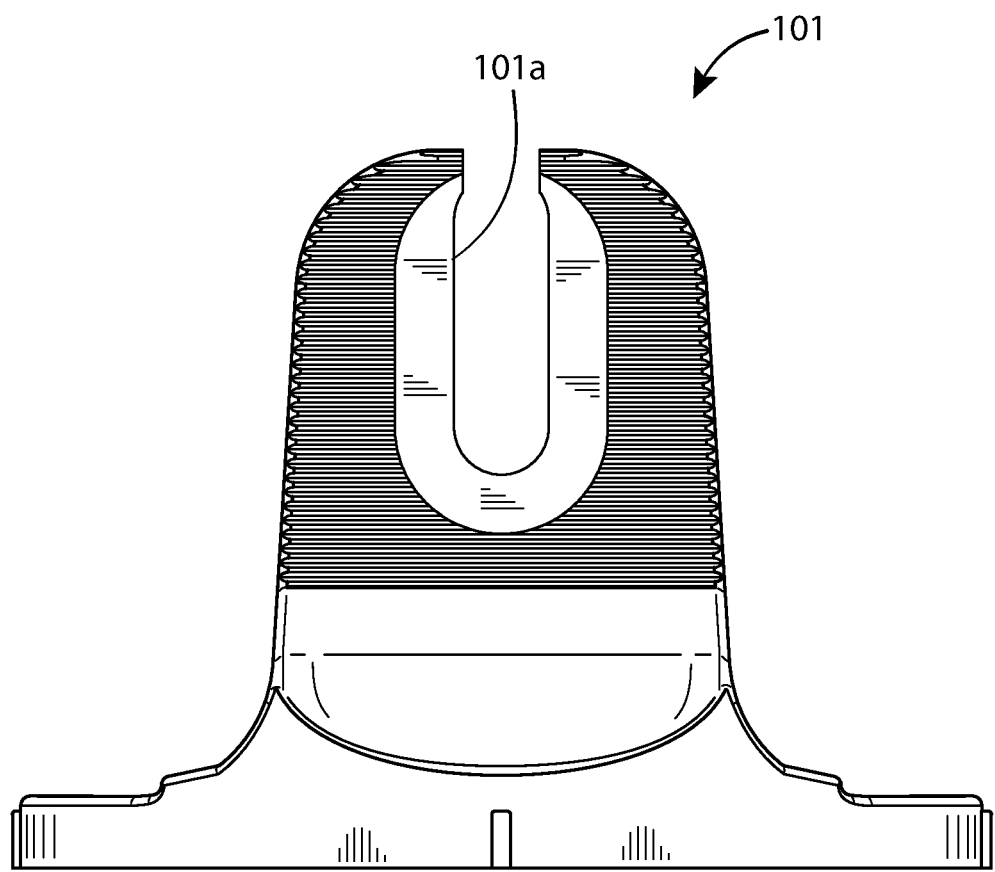
FIG. 6 illustrates in rear view, the L-foot of FIG. 1.

Referring to FIG. 5, the first raised stiffener 101*d* and the second raised stiffener 101*e*, each have a widthwise wedge-shaped profile. For the purposes of this disclosure, widthwise with respect to the base 101*b* refers to the direction between the first side 101*f* and the second side 101*g*. As illustrated in FIGS. 12 and 13, the first raised stiffener 101*d* has a first widthwise wedge-shaped cross section 101*h*. The second raised stiffener 101*e* has a second widthwise wedge-shaped cross section 101*i*. The first widthwise wedge-shaped cross section 101*h* extends upward away from the first side 101*f* toward the center of the base 101*b*. The second widthwise wedge-shaped cross section 101*i* extends upward away from the second side 101*g* and toward the center of the base 101*b*.

Referring to FIGS. 3, 4, and 8-12, base 101*b* includes a first aperture 101*j*. Referring to FIG. 12, the first aperture 101*j* extends perpendicularly through the first raised stiffener 101*d* and obliquely through the bottom 101*k* of the base 101*b*.

Referring to FIGS. 3, 4, 7, 9-12, the base 101*b* includes a second aperture 101*m*. Referring to FIG. 12, the second aperture 101*m* extends perpendicularly through the second raised stiffener 101*e* and obliquely through the bottom 101*k* of the base 101*b* toward the first aperture 101*j*.

Figure 9:
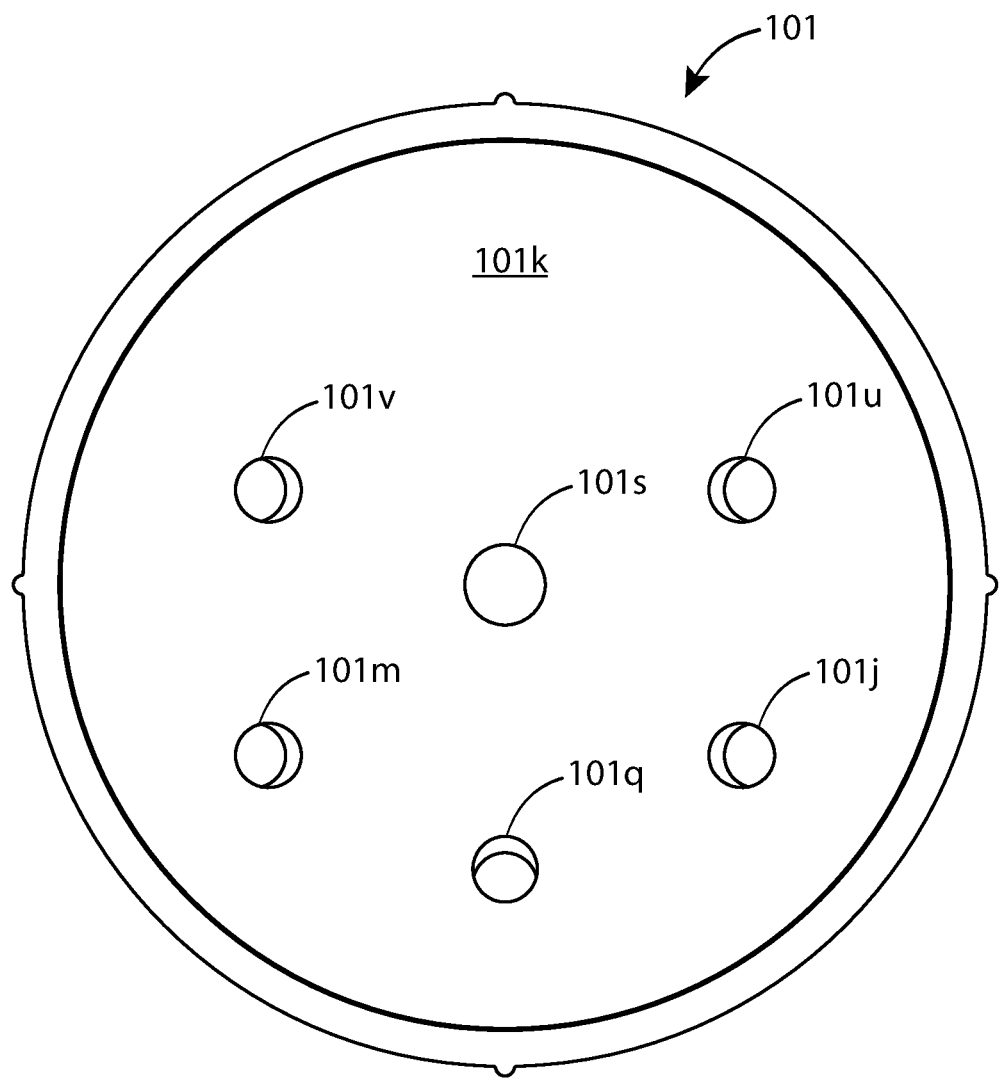
FIG. 9 illustrates in bottom view, the L-foot of FIG. 1.

FIG. 9 also shows the first aperture 101*j* and the second aperture 101*m* extending through the bottom 101*k* of the base 101*b* toward each other.

Referring to FIGS. 3-5, 10, and 11, the base 101*b* also includes a third raised stiffener 101*n* extending upward from and lengthwise along the base 101*b*. The third raised stiffener 101*n* is positioned between the first raised stiffener 101*d* and the second raised stiffener 101*e*. The base 101*b* includes a front side 1010 positioned opposite the riser 101*c*. The third raised stiffener 101*n* includes an end 101*p* positioned distal to (i.e., the end 101*p* is away from) the riser 101*c*. The end 101*p* extends obliquely upward away from the front side 1010 toward the riser 101*c*. Referring to FIG. 14, the end 101*p* extends obliquely upward at an angle A9 with respect to the horizon. In this case the main body of the third raised stiffener, the top of the base 101*b*, and the bottom 101*k* of the base 102*b* are parallel to the horizon.

Figure 7:
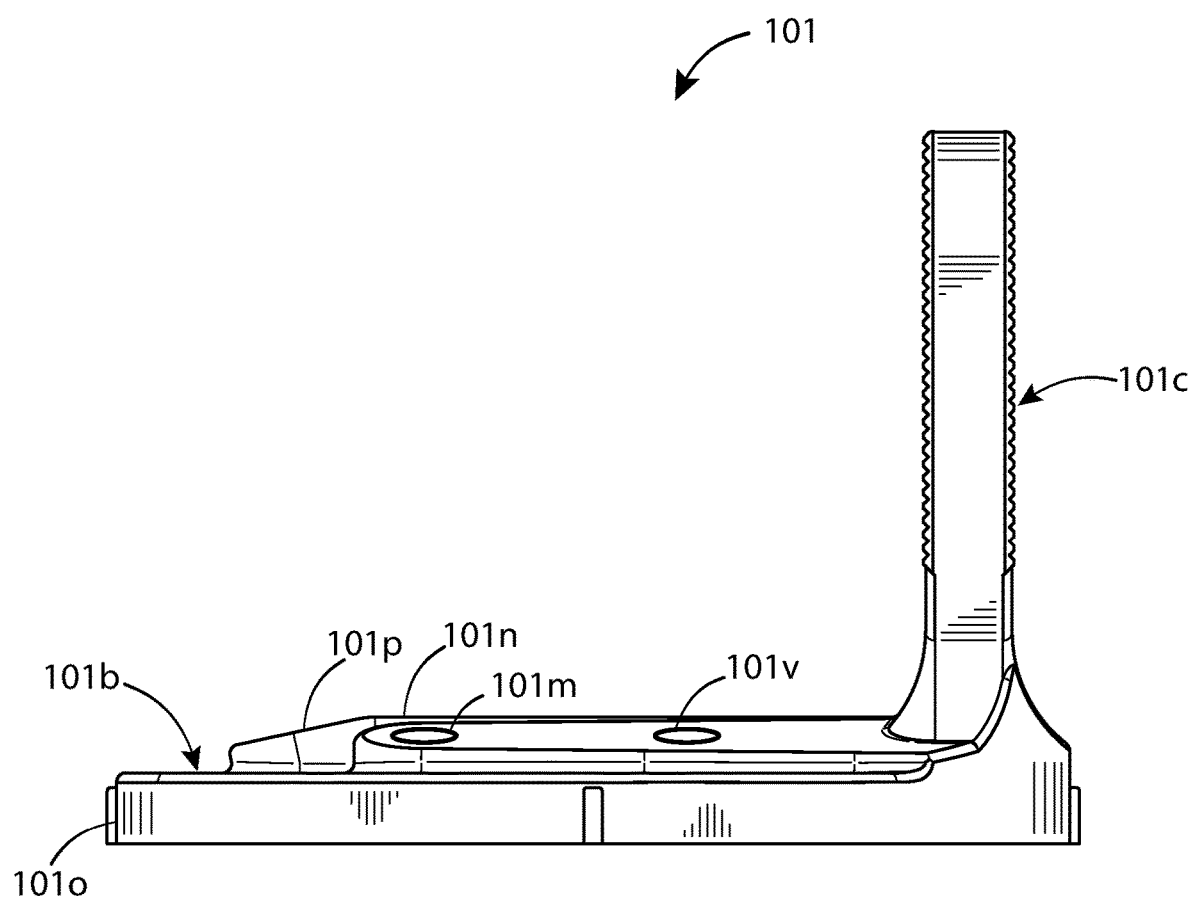
FIG. 7 illustrates in right side view, the L-foot of FIG. 1.
Figure 8:
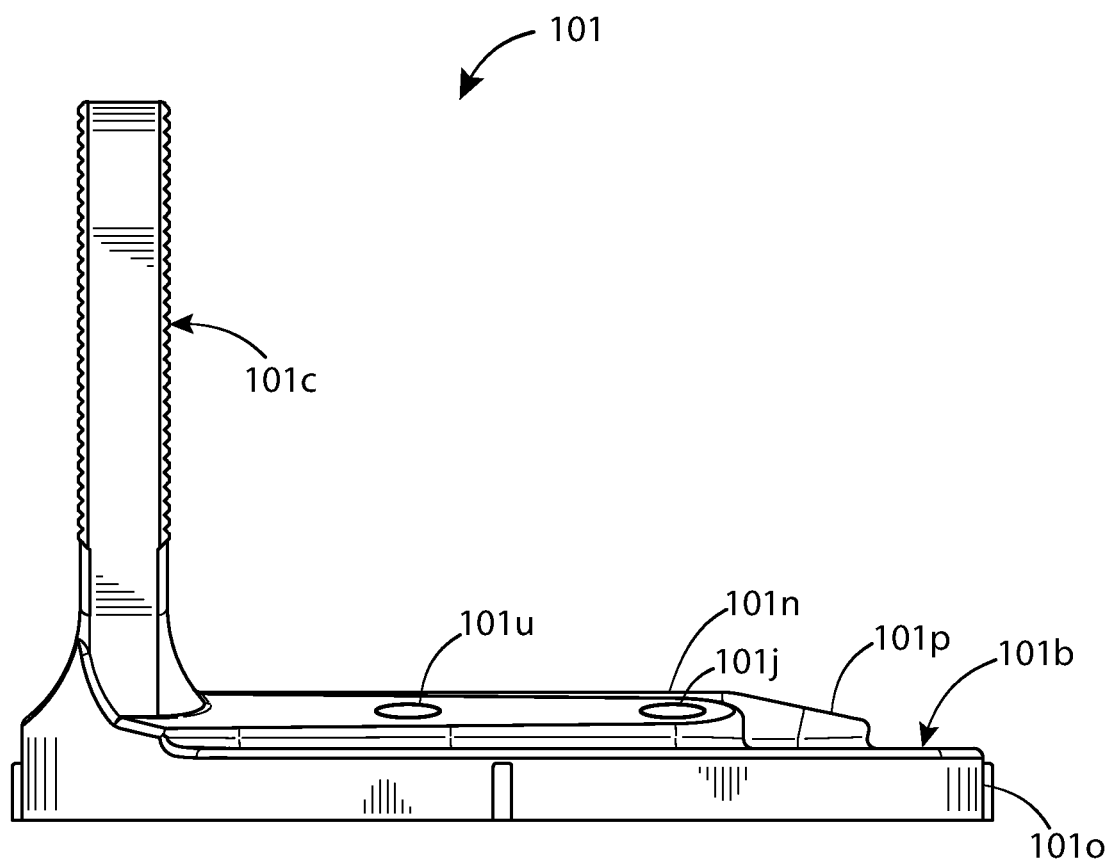
FIG. 8 illustrates in left side view, the L-foot of FIG. 1.

Referring to FIGS. 7 and 8, the end 101*p* of the third raised stiffener 101*n* has a lengthwise wedge-shaped profile. The lengthwise wedge-shaped profile extends from the base of the wedge to the top of the wedge and away from the front side 1010 and toward the riser 101*c*. FIG. 14 illustrates the end 101*p* with a lengthwise wedge-shaped cross section 101*t*.

Referring to FIG. 14, a third aperture 101*q* extends perpendicularly through the end 101*p* and obliquely through the bottom 101*k* of the base 101*b* toward the riser 101*c*. The third raised stiffener 101*n* includes a main body that is substantially planar and parallel to a seating plane 101*r* of the base 101*b*. The main body of the third raised stiffener 101*n* can extend from the riser 101*c* to the end 101*p*, as illustrated.

A fourth aperture 101*s*, extends perpendicularly through the main body of the third raised stiffener 101*n* and perpendicularly through the bottom 101*k* of the base 101*b*. FIGS. 3-5, and 9-11 also illustrate the third aperture 101*q* and the fourth aperture 101*s* (not shown in FIG. 5). FIGS. 12 and 13 illustrate the third raised stiffener 101*n* in front cross section. FIG. 12 illustrates a front cross section of the third aperture 101*q* extending through the end 101*p*. FIG. 13 illustrates a front cross section of the fourth aperture 101*s* extending through the main body of the third raised stiffener 101*n*.

The first raised stiffener 101*d* can include additional apertures. These apertures can accept additional threaded roof fasteners to provide the solar panel assembly with greater holding strength and resistance to wind and lift forces. For example, referring to FIGS. 3, 10, and 11, the first raised stiffener 101*d* can include a fifth aperture 101*u* and the second raised stiffener can include a sixth aperture 101*v*. FIGS. 4 and 8 illustrates the fifth aperture 101*u* in rear isometric view and side view, respectively. FIG. 7 illustrates the sixth aperture 101*v* in side view. FIG. 9 illustrates the fifth aperture 101*u* and the sixth aperture 101*v* in bottom view. Referring to FIG. 13, the fifth aperture 101*u* extends perpendicularly through the first raised stiffener 101*d* and obliquely through a bottom 101*k* of the base 101*b*. The sixth aperture 101*v* extends perpendicularly through the second raised stiffener 101*e* and obliquely through the bottom 101*k* of the base 101*b* toward the first raised stiffener 101*d*.

Figure 15:
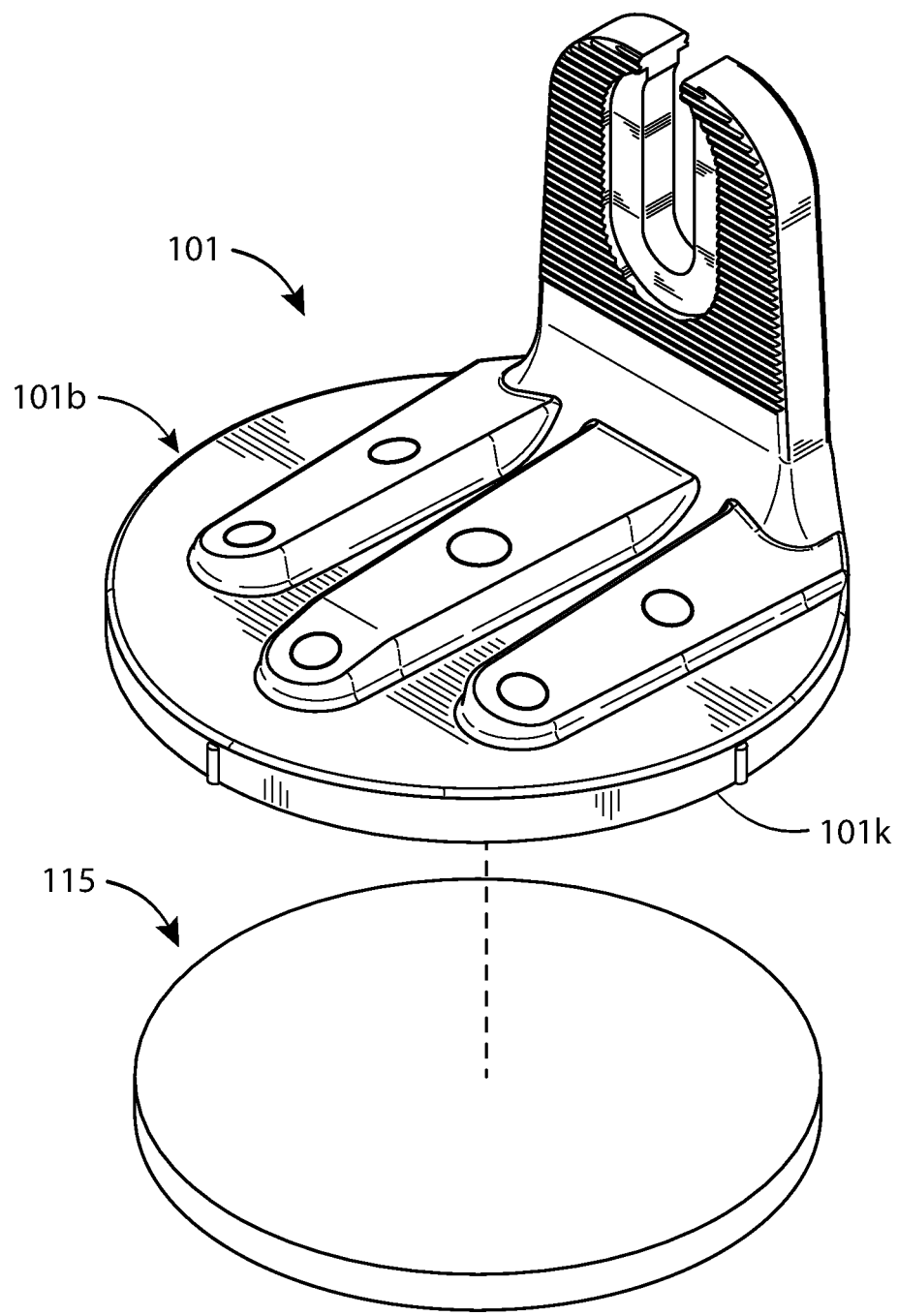
FIG. 15 illustrates in front isometric view, a gasket exploded away from the L-foot of FIG. 1.

Referring to FIGS. 12, 13, and 14, a blind aperture, or recess 101*w*, extends upward from the bottom 101*k* of the base 101*b*. The recess 101*w* can receive and seat a gasket. FIG. 15 illustrates a gasket 115, exploded away from the L-foot 101. The L-foot 101 receives and seats the gasket 115 in the bottom 101*k* of the base 101*b*.

Figure 10:
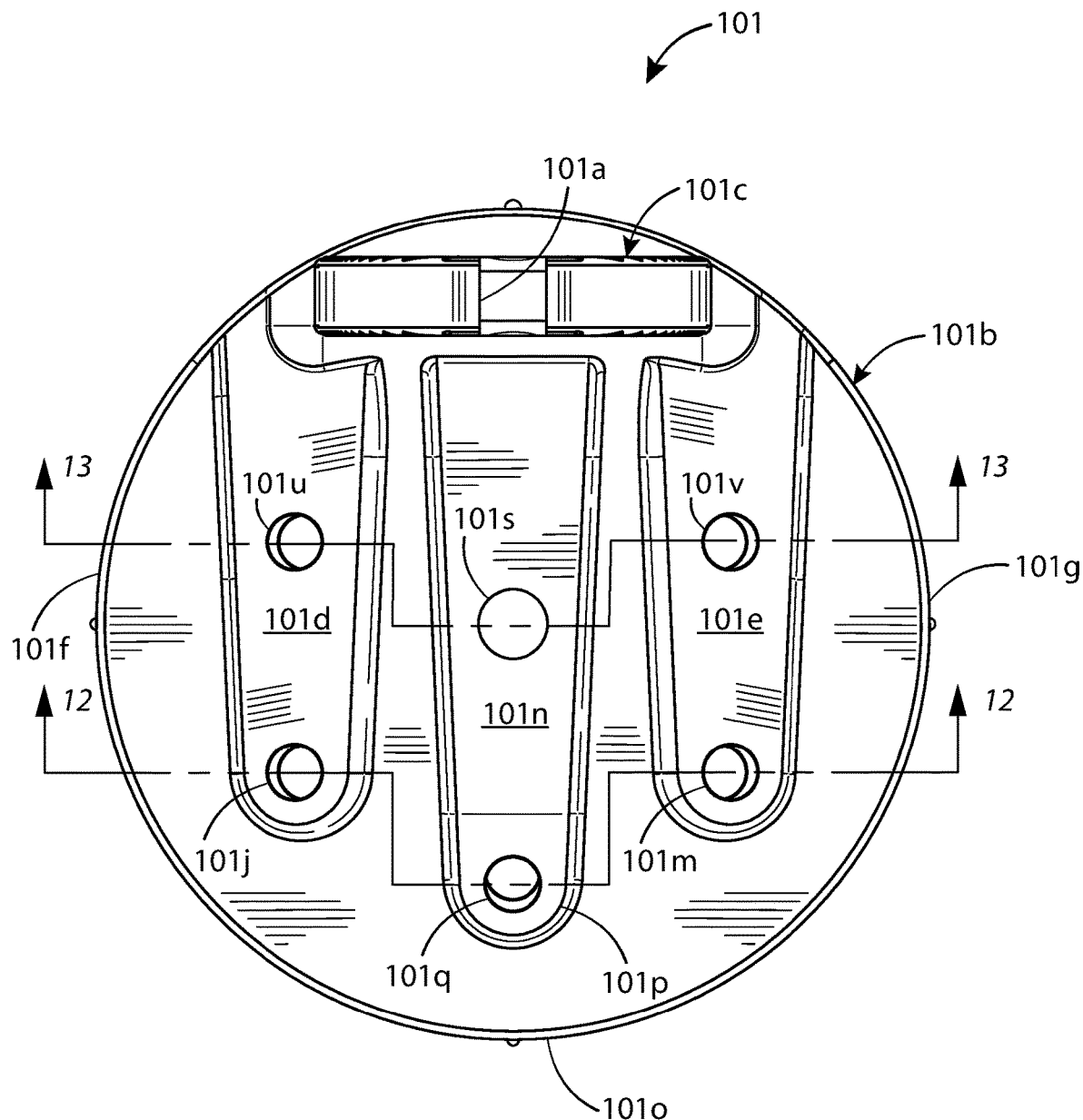
FIG. 10 illustrates in top view, the L-foot of FIG. 1 with widthwise section lines.
Figure 11:
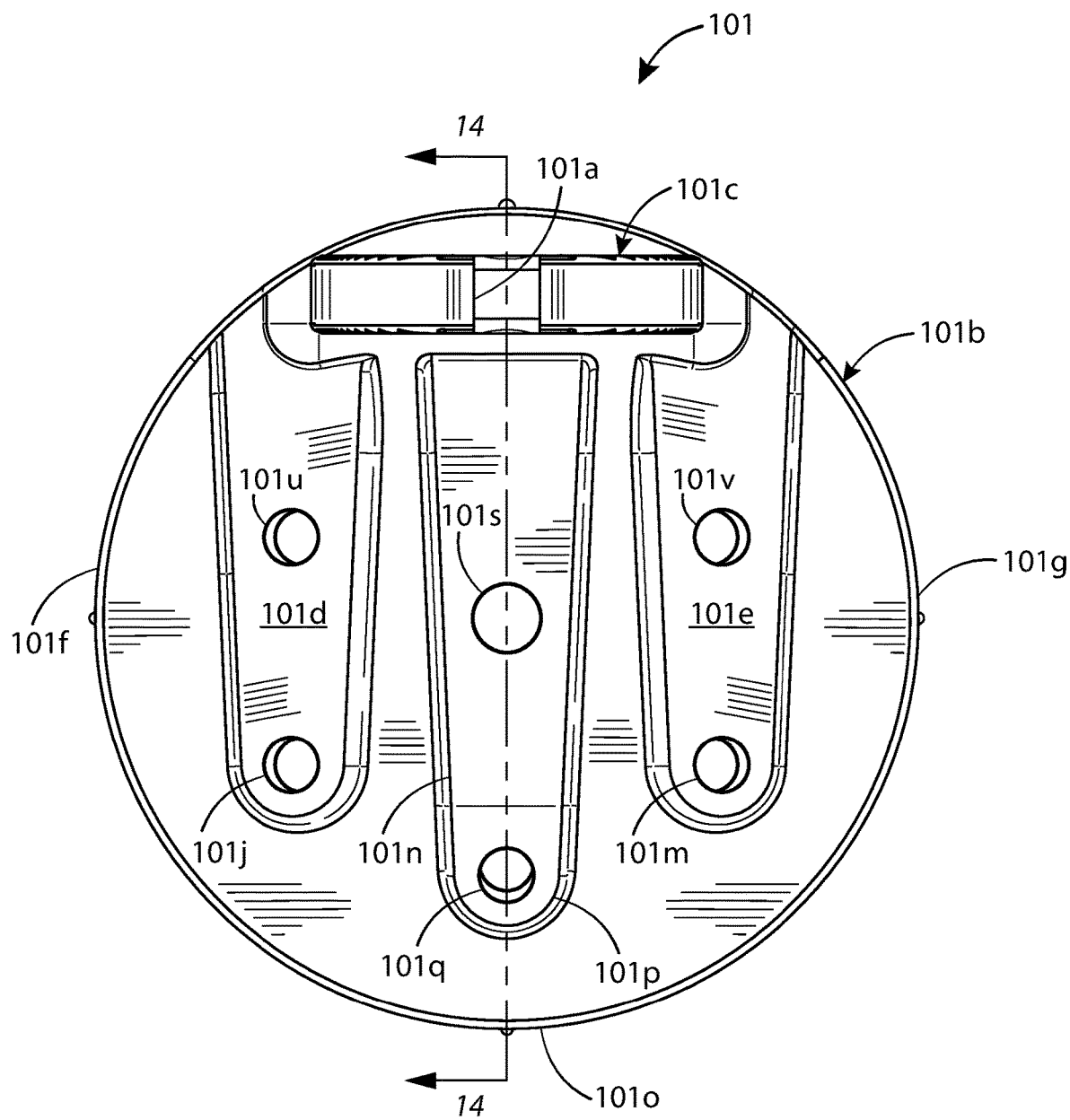
FIG. 11 illustrates in top view, the L-foot of FIG. 1 with a lengthwise section line.
Figure 16:
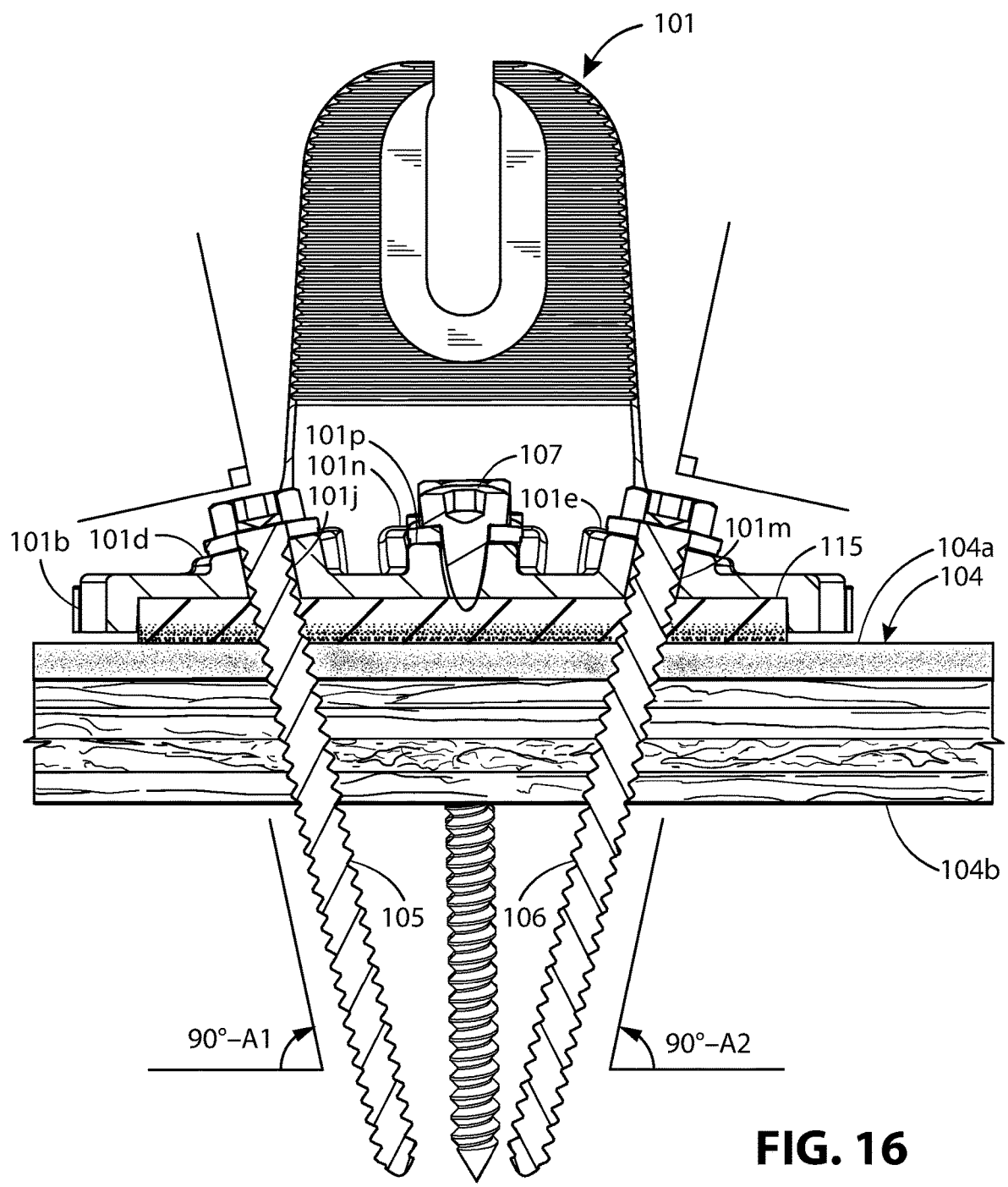
FIG. 16 illustrates an L-foot assembly secured to a roof, utilizing the L-foot of FIG. 1 with the L-foot taken along section lines 12-12 of FIG. 10.
Figure 17:
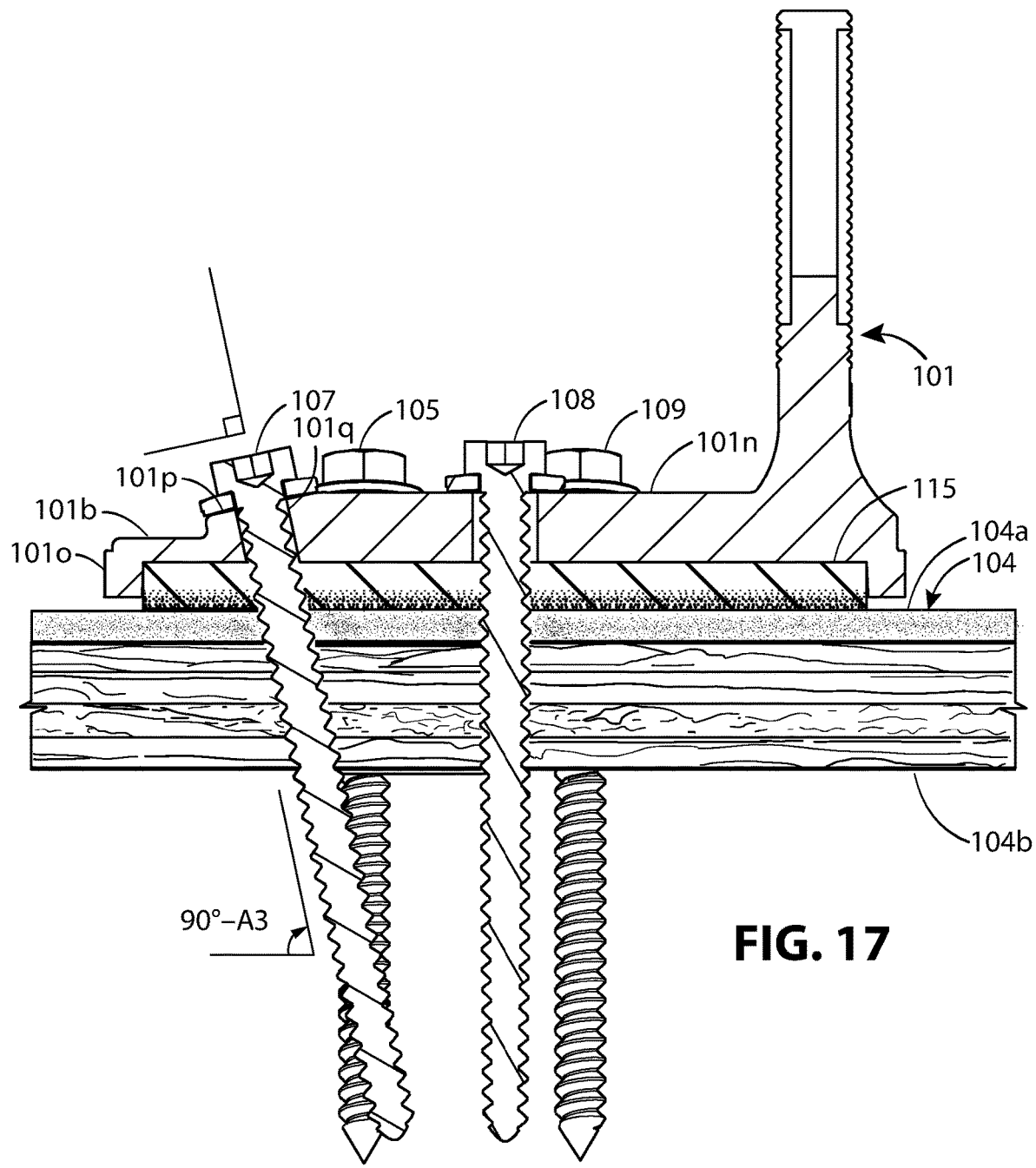
FIG. 17 illustrates an L-foot assembly secured to a roof, utilizing the L-foot of FIG. 1 with the L-foot taken along section lines 14-14 of FIG. 11.

FIGS. 16 and 17 illustrate along the cross sections 12-12 of FIG. 10 and 14-14 of FIG. 11, respectively, the L-foot 101, gasket 115, and various threaded roof fasteners attached to a roof 104. FIG. 16 illustrates the L-foot 101 with the first threaded roof fastener 105 extending through the first aperture 101*j*. The first threaded roof fastener 105 extends perpendicularly through the top of the first raised stiffener 101*d*, and extends obliquely through the base 101*b* of the L-foot 101, the gasket 115, the roof cover 104*a*, and the roof deck 104*b*. The second threaded roof fastener 106 extends perpendicularly through the second aperture 101*m*. In addition, the second threaded roof fastener 106 extends obliquely through the bottom of the base 101*b*, the gasket 115, the roof cover 104*a*, and the roof deck 104*b* toward the first threaded roof fastener 105.

The first threaded roof fastener 105 makes an oblique angle of 90°—A1. The first threaded roof fastener 105 makes an oblique angle of 90°—A2. FIG. 12 shows angle A1 and angle A2.

FIG. 17 illustrates the third threaded roof fastener 107 extending perpendicularly through the third aperture 101*q*. The third threaded roof fastener 107 extends obliquely at an angle of 90°—A3. FIG. 14 shows angle A3. Referring to FIG. 17, the third threaded roof fastener 107 extends inward away from the front side 1010 through the gasket 115, the roof cover 104*a*, and the roof deck 104*b*. The first threaded roof fastener 105, and the fifth threaded roof fastener 109 extend obliquely and inwardly below the base 101*b* and through the bottom of the roof deck 104*b*. The fourth threaded roof fastener 108 passes perpendicularly downward through the third raised stiffener 101*n*, the gasket 115, the roof cover 104*a*, and roof deck 104*b*. Referring to FIG. 16, the third threaded roof fastener 107 extends into the end 101*p* of the third raised stiffener 101*n* and through the roof deck 104*b*.

Conclusion and Variations

Described are brackets and devices for mounting solar panels to roofs. This disclosure provides examples of devices, components, and configurations to help the reader understand the described general principles. The following are examples of how different components, structures, and features can be varied while still adhering to the general principles.

Figure 18:
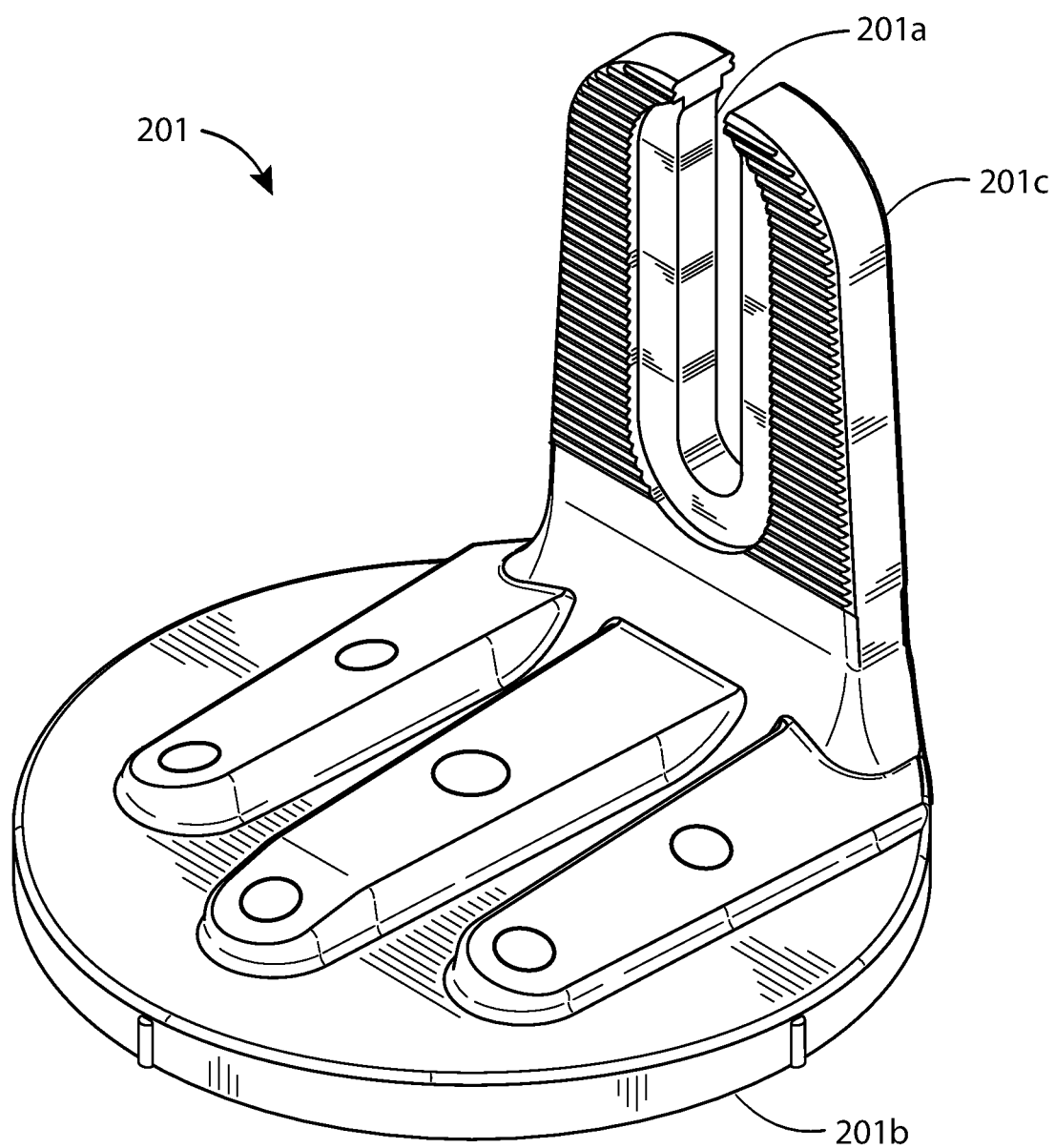
FIG. 18 illustrates the L-foot of FIG. 1 with a taller riser.

The base 101*b* as illustrated in FIGS. 3, 4, and 9-11 is a circular cylinder. The inventors envision that the base can be a cuboid, elliptic cylinder, or other shapes that accommodate the structure of the first raised stiffener 101*d*, the second raised stiffener 101*e*, and optionally, the third raised stiffener 101*n*. The inventors envision a variety of structural variations in the riser while maintaining the same or similar structure of the base 101*b*, the first raised stiffener 101*d*, second raised stiffener 101*e*, and the third raised stiffener 101*n* as discussed throughout this disclosure. While the riser of FIGS. 3-6, 10, and 11 is of a typical height, the inventors envision that the riser can be taller or shorter. For example, the riser 201*c* of the L-foot 201 of FIG. 18 is taller while the structure of the base 201*b* remains the same as described for FIGS. 3-14.

Figure 19:
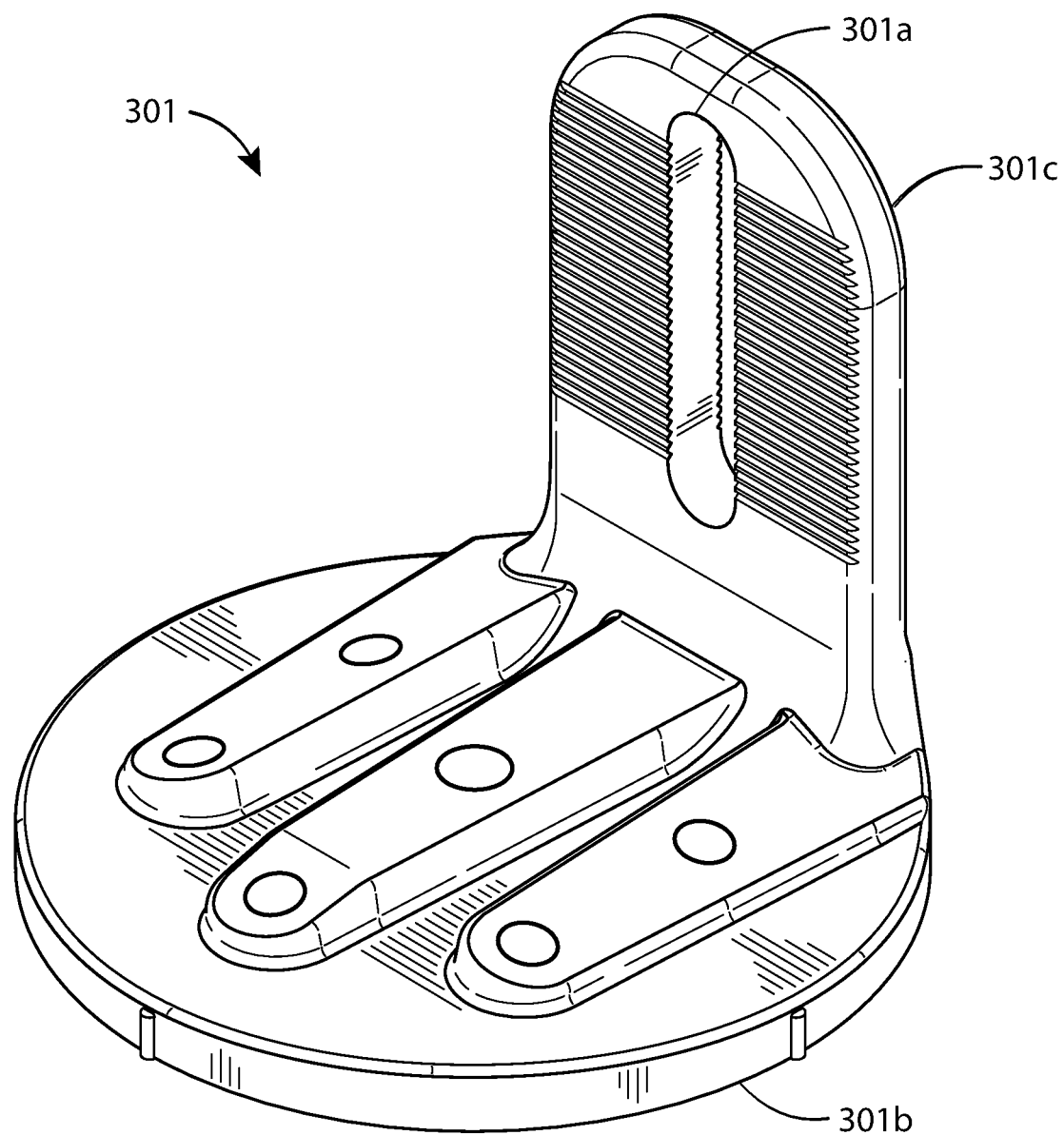
FIG. 19 illustrates the L-foot of FIG. 1 with a slot-shaped aperture that is closed on both ends.

The riser 101*c*, shown in various views in FIGS. 3-6, 10, and 11 includes slot-shaped aperture 101*a* that is open at the top of the riser. The slot-shaped aperture can alternatively be closed on both ends. FIG. 19 illustrates the L-foot 301 that includes a base 301*b* with a similar structure as base 101*b* of FIG. 3. Riser 301*c* has a closed slot shaped aperture, the slot-shaped aperture 301*a*.

Figure 3:
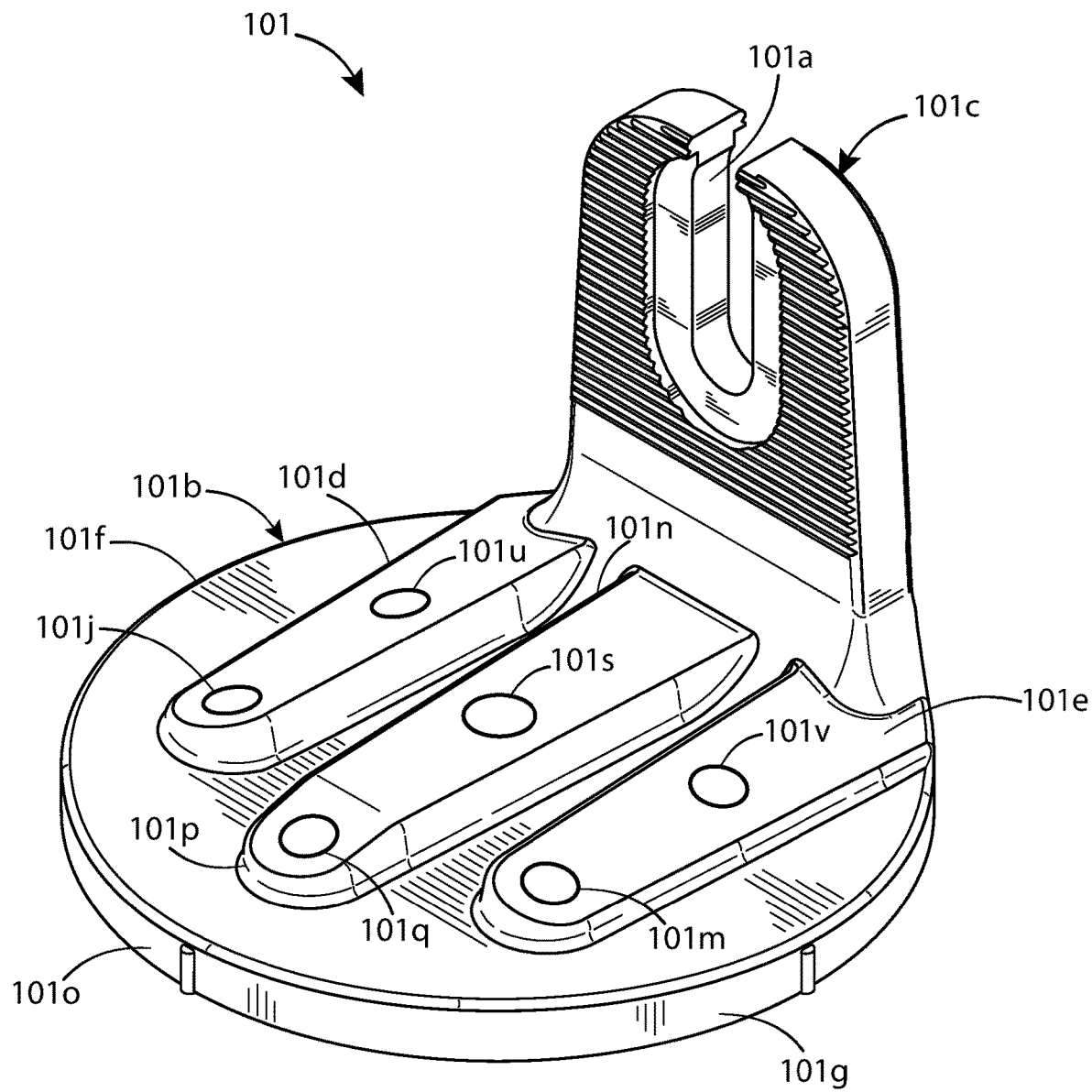
FIG. 3 illustrates in front isometric view, the L-foot of FIG. 1.
Figure 4:
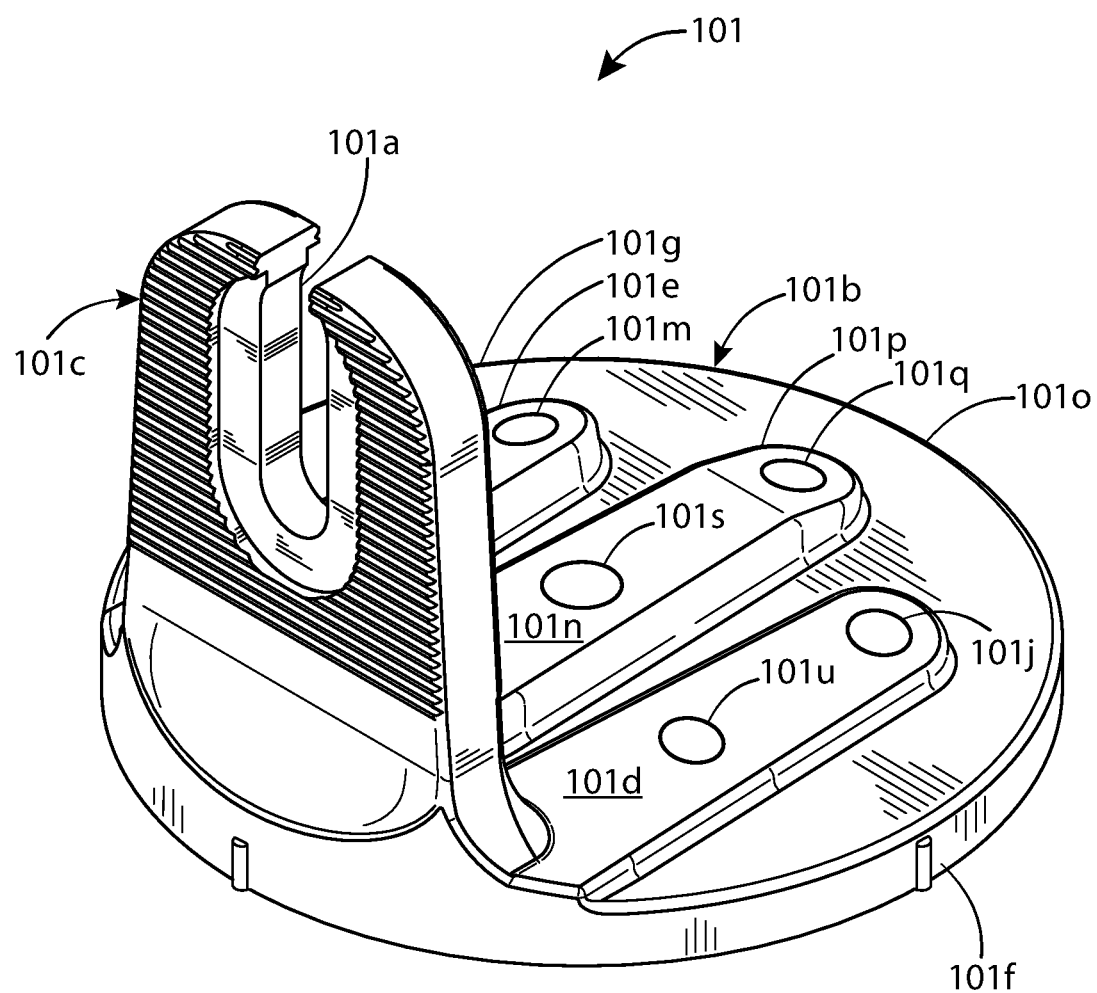
FIG. 4 illustrates in rear isometric view, the L-foot of FIG. 1.

Referring to FIG. 3, the inventors envision changing the shape of the riser 101*c* without affecting the structure or function of the base 101*b*, first raised stiffener 101*d*, second raised stiffener 101e, and the third raised stiffener 101n. For example, the riser 101c can have a rectangular, or triangular face profile.

The threaded roof fasteners illustrated throughout this disclosure are suggestive of what an installer could use. For example, the first threaded roof fastener 105, second threaded roof fastener 106, the third threaded roof fastener 107, the fourth threaded roof fastener 108, the fifth threaded roof fastener 109, and the sixth threaded roof fastener 110 as illustrated in FIGS. 1 and 2, are hex-head decking screws with a hexagonal socket. This screw head style is compatible with common power or hand tools. The installer could choose threaded roof fasteners with other head styles that suits either power tools or hand tools. For example, the installer could use a hex-head cap screw, also known as a hex-head bolt or hex-head screw. Other examples include pan-head, button-head, or round head screws. These can include hexagonal sockets, Phillips head sockets, slotted sockets, hi-torque sockets, square sockets, Robertson head sockets, or Torx head sockets. They can also include various custom or off-the-shelf security head screws. The threaded roof fasteners illustrated are deck screws with built-in seals. They could alternatively be lag bolts with sealing washers. The inventors envision using any screw or bolt that can perform the function specified in this specification, provide a water tight seal, and provide enough holding strength to perform to the typical environmental conditions expected for a solar panel array installation.

FIGS. 3, 10, and 11, illustrate the first raised stiffener 101d, the second raised stiffener 101e, and the third raised stiffener 101n, each with two apertures. The inventors envision that each of the raised stiffeners can include fewer apertures or additional apertures. For example, for some installations, it may be possible to eliminate the first aperture 101j, the second aperture 101m, and the fourth aperture 101s. In other installations, it may be possible to remove the third raised stiffener 101n and its associated apertures. The position of the apertures can be changed relative to their raised stiffeners. The length of the raised stiffeners can be lengthened or shortened to accommodate more or fewer threaded roof fasteners. The width of the raised stiffeners can be widened or narrowed to accommodate threaded roof fasteners with wider or narrower bodies and wider or narrower heads. The number of apertures and their associated fasteners depends on several factors. These include anticipated environmental conditions, such as wind loads, roof structural factors such as roof decking materials and thicknesses, or regulatory considerations, such as regional or national rules governing solar panel installation.

The L-foot 101 of FIGS. 1-17, the L-foot 201 of FIG. 18, and the L-foot 301 of FIG. 19 can be made of any material that has sufficient structural strength to support solar panels and their associated racking systems to a roof and to withstand expected environmental conditions such as wind loads, temperature variations, and ultra-violet (UV) light from the sun. Examples of suitable materials include aluminum, steel, or thermoplastics, or thermoset polyurethanes. An aluminum or steel L-foot could be formed by casting, CNC milling, or 3D printing. Referring to FIG. 3, while the L-foot 101 is depicted as being formed from one piece of material, the riser 101c and the base 101b could be separately formed and then joined by fasteners or by welding. For example, the riser 101c or the base 101b could be stamped, cast, or extruded and then finished with secondary operations. A thermoplastic L-foot could be molded or 3D printed.

Some regions or authorities may require the L-foot to be electrically conductive. Examples of electrically conductive materials suitable for the L-foot include metals, or plastics with conductive properties. For example, aluminum and steel conduct electricity and have sufficient structural strength to withstand expected environmental conditions. Depending on the region and their regulatory requirements, thermoset polyurethane or thermoplastics with embedded metal salts or other conductive materials may have sufficient strength and electrical conductivity.

The L-foot could have more or fewer apertures for receiving roof fasteners and the position of the apertures can change. For example, for some regions, an L-foot adapter with two apertures or three apertures might be sufficient. Referring to FIG. 3, a two-aperture example, might eliminate the first aperture 101j, the second aperture 101m, the third aperture 101q, and the fourth aperture 101s but leave the fifth aperture 101u and the sixth aperture 101v. A three-aperture example might leave the third aperture 101q, the fifth aperture 101u, and the sixth aperture 101v. The L-foot could have their apertures arranged along their respective stiffeners to meet specific design parameters. For example, for the three-aperture example, the apertures could be arranged to form an equilateral triangle to increase stability.

Similarly, the installer might opt to install threaded roof fasteners in some of the apertures while not in others. For example, while FIG. 1 shows six threaded roof fasteners securing the L-foot 101 to roof 104. An installer could choose to use fewer threaded roof fasteners if doing so meets the installation requirements of their region. For example, in regions not subject to high winds, the installer might opt to install third threaded roof fastener 107, fifth threaded roof fastener 109, and sixth threaded roof fastener 110 and not the others. The installer could fill the remaining holes with a sealant, such as silicone.

FIG. 3 shows the top surface of the first aperture 101j and the fifth aperture 101u of the first raised stiffener 101d in the same plane. Similarly, the second aperture 101m and the sixth aperture 101v of the second raised stiffener 101e lie in the same plane. Viewing these apertures in cross section, referring to FIGS. 12 and 13, angle A1 (FIG. 12) equals angle A4 (FIG. 13). Angle A2 (FIG. 13) equals angle A5 (FIG. 13). The inventors envision that a raised stiffener could include roof-fastener receiving portions that have different oblique angles with respect to the horizon from each other. In this case, angle A1 would not equal angle A4. Angle A2 would not equal angle A5. This arrangement could further optimize installation and improve hold down strength of the L-foot 101.

The variations described, the general principles taught, and undescribed variations, devices, and systems that encompass the general principles described in this disclosure, are within the scope of the claims.

The invention claimed is:

1. A device for attaching a solar panel to a roof, comprising:
   an L-foot that includes a base and a riser extending upward from the base and together forming a substantially L-shape;
   the base includes a first raised stiffener and a second raised stiffener, each extending obliquely upward toward each other from opposite sides of the base and each extending lengthwise along the base, and a third raised stiffener extending upward from and lengthwise along the base and positioned between the first raised stiffener and the second raised stiffener; and the base includes a first aperture extending perpendicularly through the first raised stiffener and obliquely through a bottom of the base and a second aperture extending perpendicularly through the second raised stiffener and obliquely through the bottom of the base toward the first aperture.

2. The device of claim 1, wherein:
the first raised stiffener and the second raised stiffener have a widthwise wedge-shaped cross section.

3. The device of claim 1, wherein:
the base includes a front side positioned opposite the riser; and
the third raised stiffener includes an end positioned distal to the riser and that extends obliquely upward from the front side toward the riser.

4. The device of claim 3, wherein:
the base includes a third aperture extending perpendicularly through the end and obliquely through the bottom of the base toward the riser.

5. The device of claim 3, wherein:
the third raised stiffener includes a main body that is substantially planar that extends from the riser to the end and is parallel to a seating plane of the base.

6. The device of claim 3, wherein:
the end includes a lengthwise wedge-shaped cross section.

7. The device of claim 1, wherein:
the riser includes a slot-shaped aperture extending upward and lengthwise along the riser.

8. The device of claim 1, further comprising:
a first threaded roof fastener extending through the first aperture and a second threaded roof fastener extending through the second aperture toward the first threaded roof fastener.

9. The device of claim 8, further comprising:
a gasket seated in a bottom of the base; and
the first threaded roof fastener and the second threaded roof fastener extend through the gasket.

10. The device of claim 9, wherein:
the first raised stiffener and the second raised stiffener have a widthwise wedge-shaped cross section.

11. The device of claim 9, wherein:
the riser includes a slot-shaped aperture extending upward and lengthwise along the riser.

12. The device of claim 9, wherein:
the base further includes a third raised stiffener extending upward from and lengthwise along the base and positioned between the first raised stiffener and the second raised stiffener.

13. The device of claim 12, further comprising:
the base includes a front side positioned opposite the riser;
the third raised stiffener includes an end positioned that extends obliquely upward from the front side toward the riser; and a third threaded roof fastener extending through the end and extending inward below the base.

14. The device of claim 13, wherein:
the end includes a lengthwise wedge-shaped cross section.

15. The device of claim 13, wherein:
the third raised stiffener includes a main body that is substantially planar that extends from the riser to the end and is parallel to a seating plane of the base.

16. The device of claim 15, wherein:
the base includes a third aperture extending perpendicularly through the end and obliquely through the bottom of the base toward the riser; and
the third threaded roof fastener extending through the third aperture extending inward below the base.

17. A device for attaching a solar panel to a roof, comprising:
an L-foot that includes a base and a riser extending upward from the base and together forming a substantially L-shape, the riser non-adjustably attached to the base;
the base includes a first raised stiffener and a second raised stiffener, each extending obliquely upward toward each other from opposite sides of the base and each extending lengthwise along the base; and
the base includes a first aperture extending perpendicularly through the first raised stiffener and obliquely through a bottom of the base and a second aperture extending perpendicularly through the second raised stiffener and obliquely through the bottom of the base toward the first aperture.

18. The device of claim 17, wherein the riser and the base are formed from one piece of material.

19. A device for attaching a solar panel to a roof, comprising:
an L-foot that includes a base and a riser extending upward from the base and together forming a substantially L-shape;
the base includes a first raised stiffener and a second raised stiffener, each extending obliquely upward toward each other from opposite sides of the base and each extending lengthwise along the base;
the base includes a bottom and a recess extending into the bottom, a first aperture extending perpendicularly through the first raised stiffener and obliquely through the recess and a second aperture extending perpendicularly through the second raised stiffener and obliquely through the recess toward the first aperture; and
a gasket seated in the recess and extending over the first aperture and the second aperture.

* * * * *